United States Patent
Zhang et al.

(10) Patent No.: US 12,180,089 B2
(45) Date of Patent: Dec. 31, 2024

(54) WET SYNTHESIS METHOD FOR NCMA HIGH-NICKEL QUATERNARY PRECURSOR

(71) Applicant: ZHEJIANG PAWA NEW ENERGY CO., LTD, Zhuji (CN)

(72) Inventors: Bao Zhang, Zhuji (CN); Zhenyu Wang, Zhuji (CN)

( * ) Notice: Subject to any disclaimer, the term of this patent is extended or adjusted under 35 U.S.C. 154(b) by 0 days.

(21) Appl. No.: 17/768,046

(22) PCT Filed: Aug. 3, 2021

(86) PCT No.: PCT/CN2021/110196
§ 371 (c)(1),
(2) Date: Apr. 11, 2022

(87) PCT Pub. No.: WO2022/033351
PCT Pub. Date: Feb. 17, 2022

(65) Prior Publication Data
US 2024/0092656 A1    Mar. 21, 2024

(30) Foreign Application Priority Data
Aug. 10, 2020   (CN) .......................... 202010795833.7

(51) Int. Cl.
*C01G 53/00* (2006.01)
(52) U.S. Cl.
CPC ........ *C01G 53/006* (2013.01); *C01P 2004/03* (2013.01); *C01P 2004/32* (2013.01); *C01P 2004/61* (2013.01); *C01P 2006/40* (2013.01)
(58) Field of Classification Search
CPC .................................................. C01G 53/006
See application file for complete search history.

(56) References Cited

U.S. PATENT DOCUMENTS

2019/0312265 A1 * 10/2019 Yonemoto ............. H01M 4/485

FOREIGN PATENT DOCUMENTS

| CN | 106785177 A | 5/2017 |
| CN | 107857309 A | 3/2018 |

(Continued)

OTHER PUBLICATIONS

English Translation of International Search Report for corresponding PCT/CN2021/110196, dated Sep. 12, 2021.
(Continued)

*Primary Examiner* — William D Young
(74) *Attorney, Agent, or Firm* — Egbert, McDaniel & Swartz, PLLC (57) ABSTRACT

In the technical field of lithium ion batteries, disclosed is a wet synthesis method of a high-nickel NCMA quaternary precursor. The method includes synthesizing solid tiny crystal nuclei of the NCMA quaternary precursor in a first reactor, and prompting the crystal nuclei of the quaternary precursor to grow to a certain particle size in a second reactor, wherein in the first reactor, an upper feeding mode is used to continuously produce the solid tiny crystal nuclei of the NCMA quaternary precursor. In the second reactor, an upper-and-lower dual feeding mode is used to prompt the continuous growth of the solid tiny crystal nuclei of the NCMA quaternary precursor. During a washing process, the NCMA quaternary precursor is washed with a mixed alkali solution of sodium carbonate and sodium hydroxide at certain concentration, so that Na can be reduced below 50 ppm and sulfur can be reduced below 800 ppm.

18 Claims, 1 Drawing Sheet

(56) References Cited

FOREIGN PATENT DOCUMENTS

| | | | |
|---|---|---|---|
| CN | 107892335 | A | 4/2018 |
| CN | 106549150 | B | 5/2019 |
| CN | 109994726 | A | 7/2019 |
| CN | 111252815 | A | 6/2020 |
| CN | 109962237 | B | 8/2021 |
| EP | 3093272 | A1 | 11/2016 |

OTHER PUBLICATIONS

Written Opinion of the International Searching Authority for corresponding PCT/CN2021/110196, dated Oct. 20, 2021.

* cited by examiner

WET SYNTHESIS METHOD FOR NCMA HIGH-NICKEL QUATERNARY PRECURSOR

TECHNICAL FIELD

The invention belongs to the technical field of lithium ion batteries, and specially relates to a method of preparing a quaternary precursor of a cathode material for a lithium ion battery.

BACKGROUND

At present, high-nickel NCM ternary precursors have lower capacity retention rate, cycle stability and thermal stability, although they have higher discharge capacity. In the high-nickel NCMA quaternary precursors, a stronger combination induced by Al binding in the host structure improves the structural stability, reduces the cation mixing, and hinders an undesired phase transition from layered phase to spinel phase during the recirculation process, thereby improving the capacity retention, recirculation performance and thermal stability. At present, the mainstream feeding method of nickel cobalt manganese or aluminum precursors is to inject salt, alkali, ammonia or other materials into the reaction system from the upper end of the reactor with a single liquid feed pipe, which is easy to cause uneven mixing of materials, local supersaturation of metal ions, high pH, and generation of large numbers of crystal nuclei (or ultrafine particles). Using ammonia as the complexing agent, $NH_3 \cdot H_2O$ can be complexed with $Ni^{2+}$ and $CO^{2+}$ so that the reaction rate is controlled to allow the pH to fluctuate in a small range during the reaction. However, $Al^{3+}$ is not easy to complex with ammonium hydroxide, and thus it precipitates faster and leads to the formation of large numbers of small particles, which may slow the growth of particles and lead to uneven distribution of elements in the NCA products. In addition, Al element has amphoteric characteristic; and the traditional washing process of NCM ternary precursors utilizes NaOH as the washing solution, which can be reacted with ammonium sulfate double salt crystals and damage the structure of the double salt, causing the release of sulfate ions. Increasing the concentration of NaOH solution is conducive to the elution of $SO_4^{2-}$, but $Al(OH)_3$ is likely to dissolve at higher concentration, resulting in main content deviation and particle morphology change of the finished product.

Due to the defects of traditional upper feeding method and NaOH strong alkali solution washing method, the conventional method of producing NCMAOH or NCAOH causes the unevenness of the particle size of the produced nickel cobalt manganese hydroxide or aluminum materials, inconsistent morphology of primary particles, and more fine powders and special-shaped spheres; and too high $SO_4^{2-}$ and $Na^+$ in the cathode precursor material may reduce the safety and cycle life of the lithium batteries. The main reasons why NCMAOH or NCAOH products comprise relatively high contents of Na and S rely on: ① some sodium ions $Na^+$ and sulfate ions $SO_4^{2-}$ or ammonium sulfate double salt crystals are unavoidably adsorbed onto the surface of NCMAOH due to the use of sulfate materials; ② in NCMAOH, $Al^{3+}$ occupies the positions of $Ni^{2+}$ and $Co^{2+}$ in the laminate, which makes the laminate to be partially positively charged, causing $SO_4^{2-}$ to intercalate to interlayer to keep neutral; ③ the sintered temperature is generally ≤800° C., and difficult to completely decompose $SO_4^{2-}$; and ④ during the exploration of production process, it is found in the research that, if the concentration of free Ni is relatively high, the aging time of slurry is relatively long, or the slurry is oxidized to dark brown, the washing effect of the product is relatively poor. Therefore, there is a need to develop a preparation process and a washing method suitable for the NCMAOH quaternary cathode material precursors.

The patent publication No. CN106785177A discloses a method of recovering and preparing quaternary cathode materials from waste nickel cobalt manganese ternary lithium ion batteries. In that invention, the waste ternary lithium ion batteries were subject to manual disassembly, magnetic separation, crushing, soaking in an organic solution, screening, sulfuric acid leaching to give a leaching liquor containing $Cu^{2+}$, $Fe^{2+}$, $Al^{3+}$, $Ni^{2+}$, $Co^{2+}$, $Mn^{2+}$, and then underwent impurity removal, primary precipitation, secondary precipitation, etc. to give an Al-doped quaternary precursor. This method can effectively deal with the failure and comprehensively utilize the lithium ion batteries. However, the manual disassembly cost is high, the impurity removal process of the leaching liquor is complex and large numbers of organic solvents are introduced; during the precipitation process, NaOH is used to precipitate a mixed solution of $Al^{3+}$, $Ni^{2+}$, $CO^{2+}$ and $Mn^{2+}$, and a traditional feeding mode is used, so that the precipitation rate of $Al^{3+}$ is much higher than those of $Ni^{2+}$, $CO^{2+}$ and $Mn^{2+}$; and the prepared precursor has poor morphology and many fine powders, which will affect the electrochemical performance of lithium ion batteries.

SUMMARY OF THE PRESENT INVENTION

The technical problem to be solved by the present invention is to overcome the above-quoted defects present in the prior art, and provides a wet synthesis method of high-nickel NCMA quaternary precursor.

The technical solutions for use in solving the technical problem of the present invention are as follows:

A wet synthesis method of a high-nickel NCMA quaternary precursor is characterized by comprising: synthesizing solid tiny crystal nuclei of the NCMA quaternary precursor in a first reactor, and prompting the solid tiny crystal nuclei of the quaternary precursor to continuously grow to a certain particle size in a second reactor;

wherein in the first reactor, an upper feeding mode is used to continuously produce the solid tiny crystal nuclei of the NCMA quaternary precursor, and in the second reactor, an upper-and-lower dual feeding mode is used to prompt the continuous growth of the solid tiny crystal nuclei of the NCMA quaternary precursor.

In particular, a wet synthesis method of a high-nickel NCMA ternary precursor comprises the steps of:

(1) formulation of solution: mixing a complexing agent with distilled water, and adjusting the concentration to give a solution A; mixing a precipitant with distilled water, and adjusting the concentration to give a solution B; mixing soluble nickel salt, cobalt salt, and manganese salt with water, and stirring to completely dissolve, to give a solution C; and dissolving an aluminum salt into deionized water and adjusting the pH value with an alkali, to prepare a solution D of sodium meta-aluminate;

(2) preparation of tiny crystal nuclei of the NCMA quaternary precursor:

① in the first reactor, first adding distilled water, the solution A, and the solution B into the reactor through a liquid feed pipe to formulate a reactor bottom liquid E, and passing an inert gas into the reactor through a gas mass flow meter to regulate the reaction atmosphere within the reactor;

② continuously pumping the solution A, the solution B, the solution C, and the solution D through the respective liquid feed pipes to a constant-temperature reactor under stirring, controlling the stirring speed of the reaction system, reaction temperature, pH value, concentration of the complexing agent, supernatant color of the slurry and concentration of the free Ni, solid content, and reaction time during the reaction process, detecting the particle size in the reaction slurry in real time, and stopping the reaction until $D_{50}$ reaches 2-10 μm, to give a slurry F of the tiny crystal nuclei of the NCMA quaternary precursor;

(3) continuous growth of the tiny crystal nuclei of the NCMA quaternary precursor:

① adding distilled water, the solution A, the solution B through the upper liquid feed pipes into the second reactor to formulate a reactor bottom liquid G, feeding the tiny crystal nuclei of the NCMA quaternary precursor prepared in Step (2) into the reactor bottom liquid G and stirring uniformly, adjusting the stirring speed of the reactor, initial pH, and temperature, and passing an inert gas to regulate the reaction atmosphere;

② continuously pumping the solution A, the solution B, the solution C, the solution D through the respective pipes into a constant-temperature reactor under stirring, allowing the tiny crystal nuclei of the NCMA quaternary precursor to continuously grow, respectively adding the solution A, the solution C, and the solution D through the respective upper and lower liquid feed pipes into the second reactor, adding the solution through the upper liquid feed pipe by the upper feeding mode, and allowing the tiny crystal nuclei of the NCMA quaternary precursor to continuously grow; during the reaction process, regulating the stirring speed, reaction temperature, pH value of the reaction, concentration of the complexing agent, solid content, reaction time, supernatant color of the slurry, concentration of free Ni, and color of slurry, detecting the particle size of the reaction slurry in real time, and stopping the reaction until $D_{50}$ reaches 3-16 μm, to give a slurry H of the high-nickel NCMA quaternary precursor;

③ discharging the precursor slurry H which satisfies the requirement of particle size through a precise filter tube, to give a solid product with uniform distribution of particle size, and recirculating the filtered fine crystal nuclei and the mother liquor to the first reactor for sequential production of crystal nuclei, achieving the recirculation of the mother liquor;

(4) washing of the NCMA quaternary precursor: washing the solid product prepared in Step (3) with a mixed solution of sodium carbonate and sodium hydroxide at a certain concentration in a centrifuge;

(5) drying, screening, and removing iron from the solid product washed in Step (4), to prepare the high-nickel NCMA quaternary precursor.

Further, in Step (1), the concentration of the complexing agent in the solution A is 4-11 mol/L, preferably 6-10 mol/L; the concentration of the precipitant in the solution B is 1-11 mol/L, preferably 6-10.8 mol/L; the total concentration of the nickel cobalt manganese metal ions in the solution C is 0.8-5.0 mol/L, preferably 1.5-3.5 mol/L; and the concentration of the sodium meta-aluminate in the solution D is 0.01-5.0 mol/L, preferably 0.5-2.5 mol/L.

Further, in Step (1), the complexing agent is at least one of ammonium hydroxide, ammonium hydrocarbonate, ethylenediamine, ethylenediamine tetraacetic acid; the precipitant is at least one of NaOH, KOH, $Ba(OH)_2$, $Na_2CO_3$ or LiOH; the soluble nickel salt, cobalt salt, and manganese salt are at least one of sulfate, acetate, halide or nitrate; and the aluminum source in the sodium meta-aluminate is at least one of aluminum nitrate, aluminum carbonate, and aluminum sulfate.

Further, in Step (2), the feeding mode of all the raw and auxiliary materials is to feed liquid(s) from the upper end, the initial pH of the formulated reactor bottom liquid E is 11-14, preferably 11.2-12.5; the concentration of the complexing agent is 6-15 g/L, preferably 6.5-12 g/L; and the volume of the reactor bottom liquid E is ⅙-1, preferably ½-1 of the volume of the reactor.

Further, in Step (2), the stirring of the reaction system is 300-1200 rpm, preferably 400-800 rpm; the solid content is 150-400 g/L, preferably 200-300 g/L; the reaction temperature is 30-90° C., preferably 50-65° C.; a small amount of slurry is sampled at certain intervals, and observed for the supernatant color of the reaction system, the supernatant is kept to be free of blue color, and the concentration of the free Ni is kept at 0-600 ppm, preferably 0-300 ppm.

Further, in Step (2) and Step (3), the flow or the total flow of the solution A is 1-80 mL/min, the flow of the solution B is 20-100 mL/min, the flow or the total flow of the solution C is 10-1000 mL/min; and the flow or the total flow of the solution D is 5-60 mL/min.

Further, the inert gas is nitrogen; and during the reaction process, the oxygen concentration in the first reactor and the second reactor is 0-10%, preferably 0-4%.

Further, the volume ratio of the second reactor to the first reactor is 4-12:1, preferably 6-10:1.

Further, in Step (3), the feeding mode through which the solution A, the solution C and the solution D are feeding into the second reactor is to feeding from both upper and lower ends; the stirring paddle within the second reactor is set as an upper stirring paddle and a lower stirring paddle; the upper liquid feed pipes for delivering the solution A, the solution C, and the solution D and the liquid feed pipe for delivering the solution B are disposed at the same horizontal position as that of the upper stirring paddle; the lower liquid feed pipes for delivering the solution A, the solution C, and the solution D are disposed at the same horizontal position as that of the lower stirring paddle; the flow ratio of the solutions in the upper and lower dual liquid feed pipes of the solution A is 1: (0.1-10), the flow ratio of the solution in the upper and lower dual liquid feed pipes of the solution C is 1: (0.1-20), and the flow ratio of the solution in the upper and lower dual liquid feed pipes of the solution D is 1: (0.1-8).

Further, in Step (3), the volume of the formulated reactor bottom liquid G is ½-1, preferably ½-⅔ of the volume of the reactor; the initial pH of the reactor bottom liquid G is controlled at 10-13, preferably 10.5-12.5; 20-220 g, preferably 50-100 g, of the tiny crystal nuclei of the NCMA quaternary precursor are added per liter of the reactor bottom liquid G; during the reaction process, the concentration of the complexing agent in the reaction system is 6-15 g/L, preferably 10-12 g/L; the stirring speed is 300-1200 rpm, preferably 600-1000 rpm; the solid content is 300-1000 g/L, preferably 300-800 g/L; the reaction temperature is 30-90° C., preferably 60-75° C.; a small amount of slurry is sampled at certain intervals and observed for the supernatant color, the supernatant is kept to be free of blue color, and the concentration of the free Ni is kept at 0-700 ppm, preferably 0-200 ppm.

Further, in Step (4), the molar concentration of the mixed solution of sodium carbonate and sodium hydroxide is 0.5-5.0 mol/L, preferably 0.8-2.0 mol/L; the molar ratio of sodium carbonate:sodium hydroxide is 1-10, preferably 1.0-5.0; and the washing temperature is 50-80° C., preferably 60-70° C.

Further, in Step (5), the drying temperature is 100-300° C., the drying time is 10-20 h, and the screen is 100-400 mesh, preferably 200 mesh.

The principles of the present invention are as follows:

Firstly, by formulating the solution of sodium meta-aluminate, the meta-aluminate can be slowly hydrolyzed to release $Al^{3+}$, slowing down the precipitation rate of $Al^{3+}$, so as to achieve the object of co-precipitating $Ni^{2+}$, $CO^{2+}$, $Mn^{2+}$, and $Al^{3+}$. Secondly, in the first reactor, the upper feeding mode is adopted to produce the tiny crystal nuclei of the NCMA quaternary precursor with uniform distribution of size and less agglomeration; and in the second reactor, the upper and lower dual feeding mode is adopted, and a certain concentration of the complexing agent is used to prompt the continuous growth of grains. The metal ion saturation in the co-precipitation system is reduced by enhancing the complexation between $NH_3$ and metal ions so that the nucleation rate of nuclei is greatly reduced, the growth rate of nuclei is continuously accelerated, the particle size of precipitation products gradually increases, the surface of the spherical particles becomes smoother and smoother, the degree of sphericity, density and dispersion are also better and better, and the previously generated fine precipitate particles are also easier to dissolve and re-precipitate on the surface of large particles. In addition, during the reaction process, the process parameters are monitored in real time and controlled, e.g., the free Ni is controlled to a lower concentration and the oxidation degree of slurry is reduced, etc. During the preparation, the inclusion of Na and S is reduced, and the process parameters are associated with the washing effect. After the reaction, the NCMA quaternary precursor is washed with a mixed solution of sodium carbonate and sodium hydroxide. A certain concentration of sodium hydroxide is used to damage the structure of ammonium sulfate double salt crystal included in the NCMAOH precursor, and prompt the release and elution of $SO_4^{2-}$. Since the exchange capacity of carbonate and sulfate ions is in the order of $CO_3^{2-} > SO_4^{2-}$, a certain concentration of $Na_2CO_3$ plays a role of exchanging $SO_4^{2-}$, so as to reduce the concentration of the sodium hydroxide solution. During the washing process, the mixed solution of sodium carbonate and sodium hydroxide will not cause Al dissolution, and the washing effect is better than that of $Na_2CO_3$ or NaOH solution alone.

The present invention has the following benefits:

In the invention, a multistage reactor is used so that the precursor production process is divided into a crystal nucleus production process and a crystal nucleus growth process. During the reaction process, the influence of process parameters, such as, reaction pH value, supernatant color of the slurry and concentration of the free Ni, and oxidation degree of the slurry (or color of the slurry) on the washing effect is specially considered and incorporated in the real-time monitoring and control items. The prepared NCMA quaternary precursor has uniform distribution of particle size and good degree of sphericity. The NCMA quaternary precursor is washed with the mixed solution of $Na_2CO_3$ and NaOH, which not only avoids the main content deviation caused by the dissolution of aluminum hydroxide by strong alkali sodium hydroxide in the washing process, but also prevents the difficulty of washing out $SO_4^{2-}$ from the manganese-containing materials with sodium carbonate alone. By washing, the Na in the high-nickel NCMA quaternary precursor can be reduced below 50 ppm, and the sulfur can be reduced below 800 ppm. The products prepared by the invention are used in the cathode material of lithium batteries. Due to the substitution of Al and the low concentration of Na and S, the cathode material shows good structural stability, capacitance retention and rate performance, low electrochemical impedance, and other advantages, and solves the problems including poor cycle rate performance of high-nickel ternary cathode material, poor thermal stability, and flatulence of NCA batteries.

BRIEF DESCRIPTION OF THE FIGURES

The accompanying drawings constituting a part of the invention are used to provide a further understanding of the invention. The schematic embodiments of the invention and the descriptions thereof are used to illustrate the invention, and do not constitute an improper limitation of the invention.

DETAILED DESCRIPTION OF THE INVENTION

Hereinafter the present invention is described in details with reference to the accompanying drawings. The description in this part is only exemplary and illustrative, but should not have any limiting effect on the protection scope of the present invention. In addition, persons skilled in the art can make corresponding combinations among the features in the embodiments and different embodiments of the document in accordance with the description of the document.

Unless otherwise specified, the chemical reagents used in the examples of the invention are routinely commercially available.

EXAMPLE 1

This example comprises the following steps:

(1) Formulation of solution: 200 L of 25% industrial ammonia water was taken to give a solution A. 32% industrial sodium hydroxide was mixed with distilled water to formulate a solution B (8.0 mol/L) with a volume of 400 L. 395.36 kg of nickel sulfate hexahydrate, 29.14 kg of cobalt sulfate heptahydrate, 8.70 kg of manganese sulfate monohydrate were sufficiently mixed with hot pure water to formulate a solution C (800 L). 79.150 kg of aluminum sulfate octadecahydrate was added into 8.0 L of 32% sodium hydroxide solution, and then diluted to 100 L to prepare a solution D of sodium meta-aluminate at 2.3754 mol/L. The molar ratio of nickel cobalt manganese aluminum Ni:Co:Mn:Al=8.8:0.6:0.3:0.3. The solutions A, B, C, and D were kept at constant temperature of 35° C.

(2) Preparation of tiny crystal nuclei of the NCMA quaternary precursor:

① In the first reactor (with a volume of 60 L), hot pure water was first added to reach ½ of the first reactor. The reactor temperature was controlled at 60° C., and the stirring rotary speed was 650 rpm. Then, the solution A and the solution B were respectively and sequentially added through the corresponding upper liquid feed pipes in the first reactor. The concentration of the ammonium hydroxide was regulated to 8.0 g/L, and the initial pH was regulated to 11.9 to formulate a reactor bottom liquid E. A precision flowmeter was opened to pass nitrogen at a gas flow of 60 L/min so that the oxygen concentration in the reactor was 0.3%.

② The flows of the solution A, the solution B, the solution C, the solution D were respectively set as 10 mL/min, 25 mL/min, 50 mL/min, and 7 mL/min, and the solutions were continuously pumped through the respective pipes into the first reactor under stirring using the upper liquid feeding mode for reaction. An intermittent concentration process was used. Under stirring at a rotary speed of 800 rpm, the flow of the solution A was adjusted to stabilize the concentration of ammonium hydroxide in the reactor at 8.0 g/L, and the flow of the solution B was adjusted to stabilize the reaction pH value of the system at 11.5-11.7. 40 ml of slurry was sampled every 2 hours, and observed for the supernatant color. The supernatant was kept to be free of blue color, and the concentration of free Ni was kept below 200 ppm. The amount of supernatant was controlled to keep the solid content at 150-200 g/L, and the reaction time was maintained at 20 h. The particle size of the suspension in the reaction equipment was monitored in real time until $D_{50}$ reached 6.0 µM to give a slurry F of the tiny crystal nuclei of the NCMA quaternary precursor.

(3) Continuous growth of the tiny crystal nuclei of the NCMA quaternary precursor:

④ Hot pure water, the solution A, and the solution B were added through the upper liquid feed pipes into the second reactor (with a volume of 640 L) to formulate a reactor bottom liquid G. The concentration of ammonium hydroxide was adjusted to 9.0 g/L, the initial pH was 11.8, and the amount of the hot pure water was ½ of the reactor. The tiny crystal nuclei of the NCMA quaternary precursor prepared in Step (2) were fed into the reactor bottom liquid G and stirred uniformly. The amount of the fed crystal nuclei was 120 g per liter of reactor bottom liquid G. Nitrogen was passed at a gas flow of 60 L/min so that the oxygen concentration in the reactor was 0.5%.

② The solution A at a total flow of 15 mL/min and a flow ratio of the solutions in the upper and lower dual liquid feed pipes in the reactor of 1:0.5, the solution C at a total flow of 500 mL/min and a flow ratio of solutions in the upper and lower liquid feed pipelines of 1:0.5, and the solution B at a flow of 160 mL/min were added through the upper feed pipes into the reactor; and the solution D at a total flow of 20 mL/min and a flow ratio of the solutions in the upper and lower dual liquid feed pipes in the reactor of 1:0.4 was added into the reactor. A continuous concentration process was used. Under stirring at a rotary speed of 700 rpm, the flows of the solutions A, B were adjusted to stabilize $C_{NH_3}$ at 9.0 g/L and the reaction pH value at 11.77-11.8. The temperature of the second reactor was 65° C. The amount of the supernatant was controlled so that the solid content was 400 g/L-500 g/L. 40 mL slurry was sampled every 2 hours, and observed for the supernatant color. The supernatant was kept to be free of blue color, and the concentration of free Ni was below 150 ppm. The tiny crystal nuclei of the NCMA quaternary precursor were allowed to continuously grow. The particle size of the suspension in the reaction equipment was monitored in real time until $D_{50}$ reached 12.5 µm to give the slurry H of the NCMA quaternary precursor.

③ The precursor slurry H which satisfied the requirement of particle size was discharged through a precise filter mesh to give a solid product with uniform distribution of particle size. The filtered fine crystal nuclei and the mother liquor were recirculated to the first reactor for sequential production of crystal nuclei, achieving the recirculation of the mother liquor.

(4) Washing of the NCMA quaternary precursor: The solid product on the precision filter mesh was transferred into a centrifuge; washed with a mixed alkali solution of 0.8 mol/L $Na_2CO_3$ and 0.2 mol/L NaOH at 65° C. for 20 min, wherein the molar concentration of the mixed alkali solution was 1.0 mol/L; centrifuged at high speed for 15 min, wherein the amount of the mixed alkali solution was 6 times of the weight of the solid product in the centrifuge; and then washed with hot pure water at 65° C. for 10 min, centrifuged at high speed for 10 min, wherein the amount of hot pure water was 20 times of the weight of the solid product in the centrifuge; and repeating water washing 5 times.

(5) The solid product which was washed to be qualified in step (4) was dried in an oven at 140° C. for 12 hours, screened with a 200 mesh screen, subject to iron removal, and packaged, so as to give the NCMA high nickel quaternary precursor.

Figure 1:
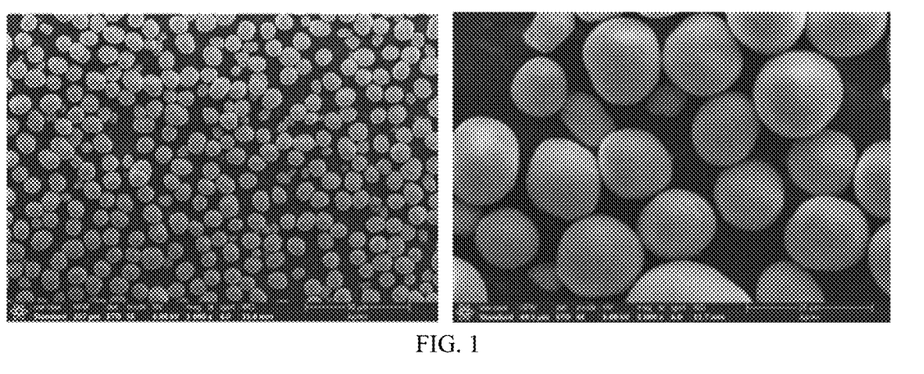
FIG. 1 is 1000× and 3000× SEM images of a 12.5 μm NCMA88060303 nickel cobalt manganese aluminum quaternary precursor prepared in Example 1.

FIG. 1 is 1000× and 3000× SEM images of a 12.5 µm NCMA88060303 nickel cobalt manganese aluminum quaternary precursor prepared in Example 1. The resultant product has good degree of sphericity, uniform distribution of particle size, and fewer micro powders. After washing, the main content of the product is qualified, including Ni 87.97 mol %, Co 5.97 mol %, Mn 2.97 mol %, and Al 3.09 mol %. The Na and S contents in impurities of the finished product are qualified, which are 58 ppm and 519 ppm, respectively, and do not significantly affect the distribution of particle size, micromorphology, and crystal structure of NCMAOH.

EXAMPLE 2

This example comprises the following steps:

(1) Formulation of solution: 280 L of 25% industrial ammonia water was taken to give a solution A. 32% industrial sodium hydroxide was mixed with distilled water to formulate a solution B (6.0 mol/L) with a volume of 300 L. 601.75 kg of nickel sulfate hexahydrate, 43.23 kg of cobalt sulfate heptahydrate, 8.86 kg of manganese sulfate monohydrate were sufficiently mixed with hot pure water to formulate a solution C (1200 L). 89.1390 kg of aluminum sulfate octadecahydrate was dissolved in water, and then excess alkali was added to prepare a solution of sodium meta-aluminate, which was adjusted to pH ~13.6, and diluted to 80 L to prepare a solution D of sodium meta-aluminate (3.3439 mol/L). The molar ratio of nickel cobalt manganese aluminum Ni:Co:Mn:Al=9.0:0.6:0.2:0.2. The solutions A, B, C, and D were kept at constant temperature of 30° C.

(2) Preparation of tiny crystal nuclei of the NCMA quaternary precursor:

① In the first reactor (with a volume of 50 L), hot pure water was first added into the first reactor to the overflow port at the upper end of the reactor. The temperature in the first reactor was controlled at 65° C., and the stirring rotary speed was 600 rpm. Then, the solution A and the solution B were respectively and sequentially added through the corresponding upper liquid feed pipes in the first reactor. The concentration of the ammonium hydroxide was regulated to 8.0 g/L, and the initial pH was regulated to 11.8 to formulate a reactor bottom liquid E. A precision flowmeter was opened to pass nitrogen at a gas flow of 60 L/min so that the oxygen concentration in the reactor was 0.1%.

② The flows of the solution A, the solution B, the solution C, the solution D were respectively set as 15 mL/min, 35 mL/min, 45 mL/min, and 6 mL/min, and the solutions were continuously pumped through the respective pipes into the first reactor under stirring using the upper liquid feeding mode for reaction. A continuous concentration process was used. Under stirring at a rotary speed of 600 rpm, the flow of the solution A was adjusted to stabilize the concentration of ammonium hydroxide in the reactor at 8.5 g/L, and the flow of the solution B was adjusted to stabilize the reaction pH value of the system at 11.8-11.9. 30 ml of slurry was sampled every 2 hours, and observed for the supernatant color. The supernatant was kept to be free of blue color, and the concentration of free Ni was kept below 180 ppm. The amount of supernatant was controlled to keep the solid content at 100-200 g/L, and the reaction time was maintained at 15 h. The particle size of the suspension in the reaction equipment was monitored in real time until $D_{50}$ reached 5.8 μM to give a slurry F of the tiny crystal nuclei of the NCMA quaternary precursor.

(3) Continuous growth of the tiny crystal nuclei of the NCMA quaternary precursor:

① Hot pure water, the solution A, and the solution B were added through the upper liquid feed pipes into the second reactor (with a volume of 600 L) to formulate a reactor bottom liquid G. The concentration of ammonium hydroxide was adjusted to 8.0 g/L, the initial pH was 11.6, and the volume of the reactor bottom liquid G was ⅔ of the volume of the second reactor. The tiny crystal nuclei of the NCMA quaternary precursor prepared in Step (2) were fed into the reactor bottom liquid G and stirred uniformly. The amount of the fed crystal nuclei was 200 g per liter of reactor bottom liquid G. Nitrogen was passed at a gas flow of 40 L/min so that the oxygen concentration in the reactor was 0.2%.

② The solution A at a total flow of 30 mL/min and a flow ratio of the solutions in the upper and lower dual liquid feed pipes in the reactor of 1:1, the solution C at a total flow of 800 mL/min and a flow ratio of solutions in the upper and lower liquid feed pipelines of 1:1, and the solution B at a flow of 120 mL/min were added through the upper feed pipes into the reactor; and the solution D at a total flow of 20 mL/min and a flow ratio of the solutions in the upper and lower dual liquid feed pipes in the reactor of 1:1 was added into the reactor. A continuous concentration process was used. Under stirring at a rotary speed of 550 rpm, the flows of the solutions A, B were adjusted to stabilize $C_{NH3}$ at 9.0 g/L and the reaction pH value at 11.5-11.8. The temperature of the second reactor was 65° C. The amount of the supernatant was controlled so that the solid content was 400 g/L-500 g/L. 40 mL slurry was sampled every 2 hours, and observed for the supernatant color. The supernatant was kept to be free of blue color, and the concentration of free Ni was below 100 ppm. The tiny crystal nuclei of the NCMA quaternary precursor were allowed to continuously grow. The particle size of the suspension in the reaction equipment was monitored in real time until $D_{50}$ reached 10.0 μm to give a slurry H of the NCMA quaternary precursor.

③ The precursor slurry H which satisfied the requirement of particle size was discharged through a precise filter mesh to give a solid product with uniform distribution of particle size. The filtered fine crystal nuclei and the mother liquor were recirculated to the first reactor for sequential production of crystal nuclei, achieving the recirculation of the mother liquor.

(4) Washing of the NCMA quaternary precursor: The solid product on the precision filter mesh was transferred into a centrifuge; washed with a mixed alkali solution of 0.6 mol/L $Na_2CO_3$ and 0.4 mol/L NaOH at 65° C. for 20 min, wherein the molar concentration of the mixed alkali solution was 1.0 mol/L; centrifuged at high speed for 15 min, wherein the amount of the mixed alkali solution was 6 times of the weight of the solid product in the centrifuge; and then washed with hot pure water at 65° C. for 10 min, centrifuged at high speed for 10 min, wherein the amount of hot pure water was 20 times of the weight of the solid product in the centrifuge; and repeating water washing 5 times.

(5) The solid product which was washed to be qualified in step (4) was dried in an oven at 160° C. for 8 hours, screened with a 200 mesh screen, subject to iron removal, and packaged, so as to give the NCMA high nickel quaternary precursor.

Figure 2:
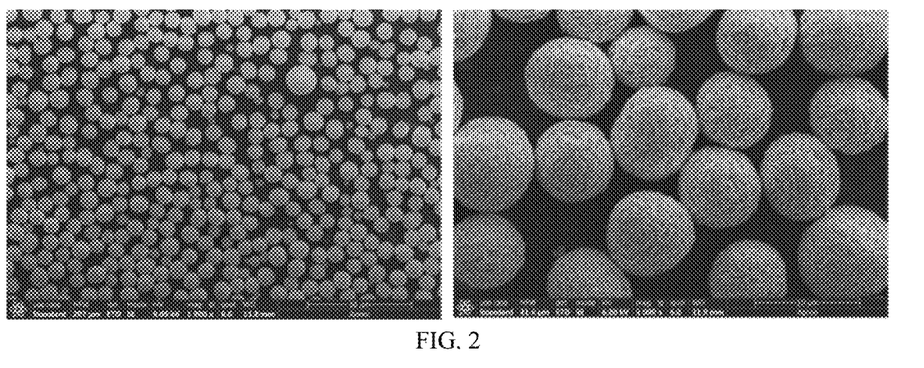
FIG. 2 is 1000× and 5000× SEM images of a 10.0 μm NCMA90060202 nickel cobalt manganese aluminum quaternary precursor prepared in Example 2.

FIG. 2 is 1000× and 5000× SEM images of a 10.0 μm NCMA90060202 nickel cobalt manganese aluminum quaternary precursor prepared in Example 2, and the size of the crystal nuclei of the precursor is 5.8 μm. The resultant product has relatively uniform particles, good degree of sphericity, smooth sphere surface, good particle flowability, and uniform distribution of particle size. After washing, the main content of the product is qualified, including Ni 90.02 mol %, Co 5.98 mol %, Mn 1.97 mol %, and Al 2.03 mol %, and no dissolution of the precursor Al is caused. In the impurity content of the finished product, the Na content is 43 ppm, and the S content is 448 ppm. The mixed solution of NaOH and $Na_2CO_3$ has better washing effect as compared with the solution of NaOH or the solution $Na_2CO_3$, and is suitable for industrial continuous production.

EXAMPLE 3

This example comprises the following steps:

(1) Formulation of solution: 25% industrial ammonia water was mixed with distilled water to formulate a solution A (6.5 mol/L) with a volume of 100 L. 32% industrial sodium hydroxide was mixed with distilled water to formulate a solution B (10.0 mol/L) with a volume of 160 L. 171.09 kg of nickel sulfate hexahydrate, 21.07 kg of cobalt sulfate heptahydrate, 18.88 kg of manganese sulfate monohydrate were sufficiently mixed with hot pure water to formulate a solution C (400 L). 38.4838 kg of aluminum sulfate octadecahydrate was added into 30.0 L of 32% sodium hydroxide solution, and then diluted to 40 L to prepare a solution D of sodium meta-aluminate (2.5872 mol/L). The molar ratio of nickel cobalt manganese aluminum Ni:Co:Mn:Al=7.0:0.8:1.2:0.5. The solutions A, B, C, and D were kept at constant temperature of 25° C.

(2) Preparation of tiny crystal nuclei of the NCMA quaternary precursor:

① First, ½ volume of hot pure water was added into a 30 L first reactor. The temperature in the first reactor was controlled at 60° C., and the stirring rotary speed was 580 rpm. Then, the solution A and the solution B were respectively and sequentially added through the corresponding upper liquid feed pipes in the first reactor. The concentration of the ammonium hydroxide was regulated to 6.0 g/L, and the initial pH was regulated to 12.4 to formulate a reactor bottom liquid E. A precision flowmeter was opened to pass nitrogen at a gas flow of 25 L/min so that the oxygen concentration in the reactor was 0.1%.

② The flows of the solution A, the solution B, the solution C, the solution D were respectively set as 10 mL/min, 25 mL/min, 20 mL/min, and 6 mL/min, and the solutions were continuously pumped through the respective pipes into the first reactor under stirring using the upper liquid feeding mode for reaction. An intermittent concentration process was used. Under stirring at a rotary speed of 600 rpm, the flow of the solution A was adjusted to stabilize the concentration of ammonium hydroxide in the reactor at 6.0 g/L, and the flow of the solution B was adjusted to stabilize the reaction pH value of the system at 11.8-11.9. 50 ml of slurry was sampled every 1.5 hours, and observed for the supernatant color. The supernatant was kept to be free of blue color, and the concentration of free Ni was kept below 200 ppm. The amount of supernatant was controlled to keep the solid content at 200-300 g/L, and the reaction time was maintained at 35 h. The particle size of the suspension in the reaction equipment was monitored in real time until $D_{50}$ reached 2.9 μM to give a slurry F of the tiny crystal nuclei of the NCMA quaternary precursor.

(3) Continuous growth of the tiny crystal nuclei of the NCMA quaternary precursor:

① Hot pure water, the solution A, and the solution B were added through the upper liquid feed pipes into the second reactor (with a volume of 200 L) to formulate a reactor bottom liquid G. The concentration of ammonium hydroxide was adjusted to 6.8 g/L, the initial pH was 12.2, and the volume of the reactor bottom liquid G occupied ⅔ of the volume of the second reactor. The tiny crystal nuclei of the NCMA quaternary precursor prepared in Step (2) were fed into the reactor bottom liquid G and stirred uniformly. The amount of the fed crystal nuclei was 240 g per liter of reactor bottom liquid G. Nitrogen was passed at a gas flow of 40 L/min so that the oxygen concentration in the reactor was 0.1%.

② The solution A at a total flow of 24 mL/min and a flow ratio of the solutions in the upper and lower dual liquid feed pipes in the reactor of 1:0.8, the solution C at a total flow of 160 mL/min and a flow ratio of solutions in the upper and lower liquid feed pipelines of 1:0.8, and the solution B at a flow of 40 mL/min were added through the upper feed pipes into the reactor; and the solution D at a total flow of 12 mL/min and a flow ratio of the solutions in the upper and lower dual liquid feed pipes in the reactor of 1:0.8 was added into the reactor. An intermittent concentration process was used. Under stirring at a rotary speed of 550 rpm, the flows of the solutions A, B were adjusted to stabilize $C_{NH3}$ at 7.0-7.5 g/L and the reaction pH value at 12.0-12.1. The temperature of the second reactor was 60° C. 50 mL of slurry was sample every 1.5 hours, and observed for the supernatant color. The supernatant was kept to be free of blue color, and the concentration of free Ni was kept below 200 ppm. The amount of the supernatant was controlled so that the solid content was 460 g/L 500 g/L. The tiny crystal nuclei of the NCMA quaternary precursor were allowed to continuously grow. The particle size of the suspension in the reaction equipment was monitored in real time until $D_{50}$ reached 4.0 μm to give a slurry H of the NCMA quaternary precursor.

③ The precursor slurry H which satisfied the requirement of particle size was discharged through a precise filter mesh to give a solid product with uniform distribution of particle size. The filtered fine crystal nuclei and the mother liquor were recirculated to the first reactor for sequential production of crystal nuclei, achieving the recirculation of the mother liquor.

(4) Washing of the NCMA quaternary precursor: The solid product on the precision filter mesh was transferred into a centrifuge; washed with a mixed alkali solution of 0.5 mol/L $Na_2CO_3$ and 0.5 mol/L NaOH at 70° C. for 15 min, wherein the molar concentration of the mixed alkali solution was 1.0 mol/L; centrifuged at high speed for 15 min, wherein the amount of the mixed alkali solution was 5 times of the weight of the solid product in the centrifuge; and then washed with hot pure water at 65° C. for 15 min, centrifuged at high speed for 8 min, wherein the amount of hot pure water was 15 times of the weight of the solid product in the centrifuge; and repeating water washing 6 times.

(5) The solid product which was washed to be qualified in step (4) was dried in an oven at 120° C. for 10 hours, screened with a 200 mesh screen, subject to iron removal, and packaged, so as to give the NCMA high nickel quaternary precursor.

EXAMPLE 4

This example comprises the following steps:

(1) Formulation of solution: 25% industrial ammonia water was mixed with distilled water to formulate a solution A (8.6 mol/L) with a volume of 260 L. 32% industrial sodium hydroxide was mixed with distilled water to formulate a solution B (9.0 mol/L) with a volume of 340 L. 1082.98 kg of nickel sulfate hexahydrate, 87.09 kg of cobalt sulfate heptahydrate, 249.66 kg of manganese sulfate monohydrate were sufficiently mixed with hot pure water to formulate a solution C (2800 L). 113.7463 kg of aluminum sulfate octadecahydrate was added into 82.0 L of 32% sodium hydroxide solution, and then diluted to 100 L to prepare a solution D of sodium meta-aluminate (3.14836 mol/L). The molar ratio of nickel cobalt manganese aluminum Ni:Co:Mn:Al=6.7:0.5:2.4:0.4. The solutions A, B, C, and D were kept at constant temperature of 32° C.

(2) Preparation of tiny crystal nuclei of the NCMA quaternary precursor:

① First, ½ volume of hot pure water was added into a first reactor with a volume of 100 L. The temperature in the first reactor was controlled at 60° C., and the stirring rotary speed was 480 rpm. Then, the solution A and the solution B were respectively and sequentially added through the corresponding upper liquid feed pipes in the first reactor. The concentration of the ammonium hydroxide was regulated to 6.3 g/L, and the initial pH was regulated to 12.2 to formulate a reactor bottom liquid E. A precision flowmeter was opened to pass nitrogen at a gas flow of 45 L/min so that the oxygen concentration in the reactor was 0.2%.

② The flows of the solution A, the solution B, the solution C, the solution D were respectively set as 20 mL/min, 45 mL/min, 90 mL/min, and 15 mL/min, and the solutions were continuously pumped through the respective pipes into the first reactor under stirring using the upper liquid feeding mode for reaction. An intermittent concentration process was used. Under stirring at a rotary speed of 480 rpm, the flow of the solution A was adjusted to stabilize the concentration of ammonium hydroxide in the reactor at 6.3 g/L, and the flow of the solution B was adjusted to stabilize the reaction pH value of the system at 12.1-11.9. 60 ml of slurry was sampled every 2 hours, and observed for the supernatant color. The supernatant was kept to be free of blue color, and the concentration of free Ni was kept below 240 ppm. The amount of supernatant was controlled to keep the solid content at 280-340 g/L, and the reaction time was maintained at 48 h. The particle size of the suspension in the reaction equipment was monitored in real time until $D_{50}$ reached 3.9 μM to give a slurry F of the tiny crystal nuclei of the NCMA quaternary precursor.

(3) Continuous growth of the tiny crystal nuclei of the NCMA quaternary precursor:

① Hot pure water, the solution A, and the solution B were added through the upper liquid feed pipes into the second reactor (with a volume of 800 L) to formulate a reactor bottom liquid G. The concentration of ammonium hydroxide was adjusted to 7.0 g/L, the initial pH was 12.0, and the volume of the reactor bottom liquid G occupied ¾ of the volume of the second reactor. The tiny crystal nuclei of the NCMA quaternary precursor prepared in Step (2) were fed into the reactor bottom liquid G and stirred uniformly. The amount of the fed crystal nuclei was 300 g per liter of reactor bottom liquid G. Nitrogen was passed at a gas flow of 80 L/min so that the oxygen concentration in the reactor was 0.2%.

② The solution A at a total flow of 40 mL/min and a flow ratio of the solutions in the upper and lower dual liquid feed pipes in the reactor of 1:3, the solution C at a total flow of 720 mL/min and a flow ratio of solutions in the upper and lower liquid feed pipelines of 1:3, and the solution B at a flow of 200 mL/min were added through the upper feed pipes into the reactor; and the solution D at a total flow of 22 mL/min and a flow ratio of the solutions in the upper and lower dual liquid feed pipes in the reactor of 1:3 was added into the reactor. A continuous concentration process was used. Under stirring at a rotary speed of 350 rpm, the flows of the solutions A, B were adjusted to stabilize $C_{NH3}$ at 7.2-7.8 g/L and the reaction pH value at 12.0-11.8. The temperature of the second reactor was 60° C. 60 mL slurry was sampled every 2 hours, and observed for the color of the supernatant. The supernatant was kept to be free of blue color, and the concentration of free Ni was below 240 ppm. The amount of the supernatant was controlled so that the solid content was 450 g/L-520 g/L. The tiny crystal nuclei of the NCMA quaternary precursor were allowed to continuously grow. The particle size of the suspension in the reaction equipment was monitored in real time until $D_{50}$ reached 5.6 μm to give a slurry H of the NCMA quaternary precursor.

③ The precursor slurry H which satisfied the requirement of particle size was discharged through a precise filter mesh to give a solid product with uniform distribution of particle size. The filtered fine crystal nuclei and the mother liquor were recirculated to the first reactor for sequential production of crystal nuclei, achieving the recirculation of the mother liquor.

(4) Washing of the NCMA quaternary precursor: The solid product on the precision filter mesh was transferred into a centrifuge; washed with a mixed alkali solution of 0.9 mol/L $Na_2CO_3$ and 0.3 mol/L NaOH at 60° C. for 10 min, wherein the molar concentration of the mixed alkali solution was 1.2 mol/L; centrifuged at high speed for 12 min, wherein the amount of the mixed alkali solution was 4 times of the weight of the solid product in the centrifuge; and then washed with hot pure water at 63° C. for 12 min, centrifuged at high speed for 10 min, wherein the amount of hot pure water was 25 times of the weight of the solid product in the centrifuge; and repeating water washing 4 times.

(5) The solid product which was washed to be qualified in step (4) was dried in an oven at 110° C. for 16 hours, screened with a 200 mesh screen, subject to iron removal, and packaged, so as to give the NCMA high nickel quaternary precursor.

EXAMPLE 5

This example comprises the following steps:
(1) Formulation of solution: 25% industrial ammonia water was mixed with distilled water to formulate a solution A (6.0 mol/L) with a volume of 160 L. 32% industrial sodium hydroxide was mixed with distilled water to formulate a solution B (8.0 mol/L) with a volume of 240 L. 158.77 kg of nickel sulfate hexahydrate, 3.56 kg of cobalt sulfate heptahydrate, 1.06 kg of manganese sulfate monohydrate were sufficiently mixed with hot pure water to formulate a solution C (300 L). 6.2038 kg of aluminum sulfate octadecahydrate was added into 18.0 L of 32% sodium hydroxide solution, and then diluted to 60 L to prepare a solution D of sodium meta-aluminate (0.3103 mol/L). The molar ratio of nickel cobalt manganese aluminum Ni:Co:Mn:Al=9.6:0.2:0.1:0.1. The solutions A, B, C, and D were kept at constant temperature of 38° C.

(2) Preparation of tiny crystal nuclei of the NCMA quaternary precursor:
① First, ½ volume of hot pure water was added into a first reactor with a volume of 30 L. The temperature in the first reactor was controlled at 65° C., and the stirring rotary speed was 600 rpm. Then, the solution A and the solution B were respectively and sequentially added through the corresponding upper liquid feed pipes in the first reactor. The concentration of the ammonium hydroxide was regulated to 7.0 g/L, and the initial pH was regulated to 12.0 to formulate a reactor bottom liquid E. A precision flowmeter was opened to pass nitrogen at a gas flow of 25 L/min so that the oxygen concentration in the reactor was 0.3%.

② The flows of the solution A, the solution B, the solution C, the solution D were respectively set as 20 mL/min, 35 mL/min, 40 mL/min, and 10 mL/min, and the solutions were continuously pumped through the respective pipes into the first reactor under stirring using the upper liquid feeding mode for reaction. An intermittent concentration process was used. Under stirring at a rotary speed of 600 rpm, the flow of the solution A was adjusted to stabilize the concentration of ammonium hydroxide in the reactor at 7.0 g/L, and the flow of the solution B was adjusted to stabilize the reaction pH value of the system at 11.9-12.0. 300 ml of slurry was sampled every 2 hours, and observed for the supernatant color. The supernatant was kept to be free of blue color, and the concentration of free Ni was kept below 280 ppm. The amount of supernatant was controlled to keep the solid content at 200-290 g/L, and the reaction time was maintained at 36 h. The particle size of the suspension in the reaction equipment was monitored in real time until $D_{50}$ reached 3.8 μM to give a slurry F of the tiny crystal nuclei of the NCMA quaternary precursor.

(3) Continuous growth of the tiny crystal nuclei of the NCMA quaternary precursor:
① Hot pure water, the solution A, and the solution B were added through the upper liquid feed pipes into the second reactor (with a volume of 300 L) to formulate a reactor bottom liquid G. The concentration of ammonium hydroxide was adjusted to 8.0 g/L, and the initial pH was 11.8. The tiny crystal nuclei of the NCMA quaternary precursor prepared in Step (2) were fed into the reactor bottom liquid G and stirred uniformly. The amount of the fed crystal nuclei was 180 g per liter of reactor bottom liquid G. Nitrogen was passed at a gas flow of 60 L/min so that the oxygen concentration in the reactor was 0.3%.

② The solution A at a total flow of 15 mL/min and a flow ratio of the solutions in the upper and lower dual liquid feed pipes in the reactor of 1:0.6, the solution C at a total flow of 250 mL/min and a flow ratio of solutions in the upper and lower liquid feed pipelines of 1:0.6, and the solution B at a flow of 60 mL/min were added through the upper feed pipes into the reactor; and the solution D at a total flow of 18 mL/min and a flow ratio of the solutions in the upper and lower dual liquid feed pipes in the reactor of 1:0.6 was added into the reactor. A continuous concentration process was used. Under stirring at a rotary speed of 600 rpm, the flows of the solutions A, B were adjusted to stabilize $C_{NH3}$ at 8.0-9.0 g/L and the reaction pH value at 11.7-11.8. The temperature of the second reactor was 65° C. 300 mL slurry was sampled every 2 hours, and observed for the color of the supernatant. The supernatant was kept to be free of blue color, and the concentration of free Ni was below 280 ppm. The amount of the supernatant was controlled so that the solid content was 350 g/L-450 g/L. The tiny crystal nuclei of the NCMA quaternary precursor were allowed to continuously grow. The particle size of the suspension in the reaction equipment was monitored in real time until $D_{50}$ reached 7.2 μm to give a slurry H of the NCMA quaternary precursor.

③ The precursor slurry H which satisfied the requirement of particle size was discharged through a precise filter mesh to give a solid product with uniform distribution of particle size. The filtered fine crystal nuclei and the mother liquor were recirculated to the first reactor for sequential production of crystal nuclei, achieving the recirculation of the mother liquor.

(4) Washing of the NCMA quaternary precursor: The solid product on the precision filter mesh was transferred into a centrifuge; washed with a mixed alkali solution of 2.5 mol/L $Na_2CO_3$ and 0.5 mol/L NaOH at 70° C. for 5 min, wherein the molar concentration of the mixed alkali solution was 3.0 mol/L; centrifuged at high speed for 10 min, wherein the amount of the mixed alkali solution was 8 times of the weight of the solid product in the centrifuge; and then washed with hot pure water at 75° C. for 15 min, centrifuged at high speed for 12 min, wherein the amount of hot pure water was 16 times of the weight of the solid product in the centrifuge; and repeating water washing 8 times.

(5) The solid product which was washed to be qualified in step (4) was dried in an oven at 100° C. for 20 hours, screened with a 200 mesh screen, subject to iron removal, and packaged, so as to give the NCMA high nickel quaternary precursor.

The above description is only the preferred embodiments of the present invention. It should be noted that persons of ordinary skills in the art can make several improvements and modifications without departing from the spirits of the present invention. Such improvements and modifications should also be regarded as the protection scope of the invention.

What is claimed:

1. A method for wet synthesis of a quarternary precursor for use in a nickel cobalt manganese aluminum (NCMA) battery, the method comprising:
    forming a solution A of a complexing agent;
    forming a solution B of a precipitant;
    forming a solution C of a nickel, cobalt and manganese salt;
    forming a solution D of a sodium meta-aluminate;
    preparing a crystal nuclei of the quarternary precursor, the step of preparing comprising:
        adding distilled water and the solution A and the Solution B in a first reactor so as to form a reactor bottom liquid E;
        regulating an initial pH and temperature and stirring speed and concentration of a complexing agent of the reactor bottom liquid E;
        passing an inert gas to the first reactor so as to regulate a reaction atmosphere within the first reactor;
        continuously adding the solution A and the solution B and the solution C and the solution D through respective feed pipes to the first reactor;
        stirring the continuously added solution A and solution B and the solution C and the solution D in an upper feeding mode;
        controlling a speed of the stirring of the continuously added solution A and solution B and the solution C and the solution D;
        controlling the temperature and the pH value of a concentration of the complexing agent;
        controlling a solids content and a reaction time and supernatant color of a slurry of the stirred solution A and solution B and the solution C and the solution D;
        controlling a concentration of free nickel in the first reactor;
        detecting a particle size of the slurry in real time; and
        stopping a reaction in the first reactor when solution D has a particle size at between 2 and 10 μm so that the slurry has the crystal nuclei therein;
    continuously growing the crystal nuclei comprising:
        adding distilled water and the solution A and the solution B so as to form a reactor bottom liquid G, the reactor bottom liquid G having a pH and a concentration of the complexing agent;
        regulating a temperature and a stirring speed and a gas atmosphere in the second reactor;
        adding the crystal nuclei into the reactor bottom liquid G in the second reactor;
        uniformly stirring the crystal nuclei and the reactor bottom liquid G in the second reactor;
        adding the solution A and the solution C and the solution D through respective upper and lower feed pipes into the second reactor in an upper-and-lower dual feeding mode;
        adding the solution B through an upper liquid feed pipe into the second reactor in an upper feeding mode;
        regulating a stirring speed and a reaction temperature and a reaction pH value in the second reactor;
        regulating a concentration of the complexing agent in the second reactor;
        regulating a solids content and a reaction time and a supernatant color of a slurry in the second reactor;
        regulating a concentration of the free nickel in the second reactor;
        detecting a particle size of the slurry in the second reactor in real time; and
        stopping a reaction in the second reactor when solution D has a particle size reaching 3 μm to 16 μm; and
    filtering the slurry from the second reactor comprising:
        washing the slurry from the second reactor;
        drying the washed slurry;
        screening the dried washed slurry such that materials remain on the screen;
        removing iron from the materials on the screen so as to produce the quarternary precursor.

2. The method of claim 1, wherein a concentration of the complexing agent in the solution A is 4-11 mol/L, the complexing agent being at least one of the ammonium hydroxide, ammonium hydrocarbonate, ethylenediamine, and ethylenediamine tetraacetic acid.

3. The method of claim 1, wherein a concentration of the precipitant in the solution B is 1-11 mol/L, the precipitant being at least one of NaOH, KOH, $Ba(OH)_2$, $Na_2CO_3$ or LiOH.

4. The method of claim 3, wherein a total concentration of the nickel and the cobalt and the manganese metal ions in the solution C is 0.8-5.0 mol/L, the nickel cobalt manganese salt being at least one of sulfate, acetate, halide and nitrate.

5. The method of claim 4, wherein a concentration of the sodium meta-aluminate in the solution D is 0.01-5.0 mol/L, an aluminum of the sodium meta-aluminate being derived from at least one of aluminum nitrate, aluminum carbonate and aluminum sulfate.

6. The method of claim 1, wherein the initial pH of the reactor bottom liquid E is between 11-14, a concentration of the complexing agent is in the reactor bottom liquid E being 6-15 g/L, a volume of the reaction bottom liquid E is one-sixth to equal to a volume of the first reactor.

7. The method of claim 6, wherein the stirring speed of the reactor is at a rate of 300-1200 rpm, wherein a solids content is in the first reactor is 150-400 g/L, the temperature in the first reactor being between 30° C. and 90° C.

8. The method of claim 7, further comprising:
sampling the slurry so as to observe the color of supernatant in the first reactor; and
determining if the sampled slurry is free of blue color and if the concentration of free nickel is 0-600 ppm.

9. The method of claim 1, wherein a volume of the reactor bottom liquid G is one-half to equal of the volume of the second reactor, the initial pH of the reactor bottom liquid G being between 11 and 13, the concentration of the complexing agent being 6 to 15 g/L.

10. The method of claim 9, wherein the step of adding the crystal nuclei comprises;
adding 20 to 220 grams the crystal nuclei per liter of the reactor bottom liquid G, a rate of the stirring in the second reactor being 300 to 1200 rpm, the solids content in the second reactor being 300-1000 g/L, the reaction temperature in the second reactor being 30° C.-90° C., the supernatant of the slurry in the second reactor being free of blue color, the concentration of the free nickel in the second reactor is 0-700 ppm.

11. The method of claim 1, wherein the step of uniformly stirring comprises:
rotating a stirring paddle in the second reactor, the stirring paddle having an upper stirring paddle and a lower stirring paddle.

12. The method of claim 11, wherein the upper feed pipes that deliver the solution A and the solution C and the solution D and the liquid feed pipe for delivering the solution B to the second reactor are disposed at a common horizontal position with the upper stirring paddle.

13. The method of claim 12, wherein the lower feed pipes delivering the solution A and the solution C and the solution D to the second reactor are disposed at a common horizontal position with the lower stirring paddle.

14. The method of claim 1, wherein a total flow of the solution A to the second reactor is 1-80 mL/minute, a flow rate of the solution B to the second reactor being 20-100 mL/minute, a flow rate of the solution C to the second reactor being 10-1000 mL/minute, a flow rate of the solution D to the second reactor being 5-60 mL/minute.

15. The method of claim 14, wherein a flow ratio in respective the upper and lower feed pipes of the solution A is 1:(0.1-10), a flow ratio in the upper and lower dual feed pipes of the solution C being 1:(0.1-20), a flow ratio in the upper and lower dual feed pipes of the solution D being 1:(0.1-8).

16. The method of claim 1, further comprising:
recirculating the filtered slurry to the first reactor so as to sequentially produce additional crystal nuclei.

17. The method of claim 1, wherein a volume of the second reactor is four to twelve times a volume of the first reactor.

18. The method of claim 1, wherein the step of washing comprises:
washing the slurry with a mixed solution of the sodium carbonate and sodium hydroxide, wherein a molar ratio of the sodium carbonate to the sodium hydroxide is 1-10:1.

* * * * *